May 15, 1928. 1,669,636
C. S. VENABLE
METHOD OF PRODUCING CARBON BLACK FROM MIXTURES OF
ACETYLENE AND OTHER HYDROCARBONS
Filed July 11, 1923
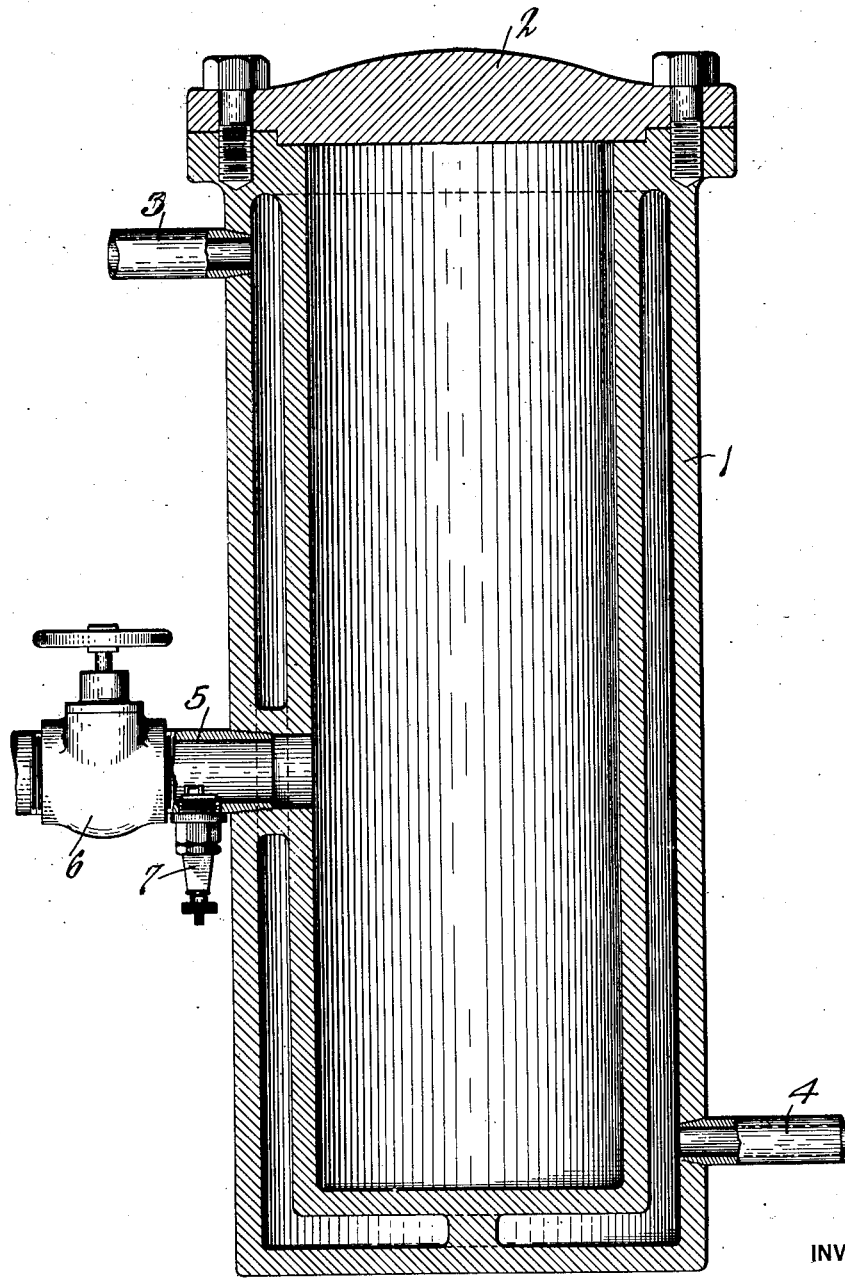
INVENTOR
CHARLES S. VENABLE.
BY
R.O.Trogner
ATTORNEY Patented May 15, 1928.

1,669,636

UNITED STATES PATENT OFFICE.

CHARLES S. VENABLE, OF CHESTER, PENNSYLVANIA, ASSIGNOR TO THE GOODYEAR TIRE & RUBBER COMPANY, OF AKRON, OHIO, A CORPORATION OF OHIO.

METHOD OF PRODUCING CARBON BLACK FROM MIXTURES OF ACETYLENE AND OTHER HYDROCARBONS.

Application filed July 11, 1923. Serial No. 650,891.

My invention pertains to the production of carbon black, and it has particular relation to the production of carbon black from mixtures of acetylene gas and other hydrocarbons.

Heretofore, the principal source of carbon black has been from the incomplete combustion of natural gas or methane, but carbon black so produced is frequently inferior in quality, and in addition, the process of production is wasteful.

One of the main applications of carbon black is found in its utilization as a filler for compounding with rubber in the production of a wide variety of rubber articles. In order to be of any great value in the rubber industry, the carbon black must necessarily be of high quality and, consequently, the inferior carbon black frequently produced by the incomplete combustion of methane is useless as a filler.

The quality of carbon black is manifested by its obscuring power and by the state of division of the particles forming it, that of good quality being formed of very finely divided particles. Exposing carbon black to heat for too long a period is one cause of its deterioration, since the particles thereof agglomerate and become hardened.

It has been suggested that very high quality carbon black may be produced by the detonation of acetylene gas, or acetylene gas mixed with air or oxygen. The method suggested is to confine the gas, or mixture of gases, in a suitable chamber under pressure and effect a detonation thereof by any suitable means, such as an electric spark. The extremely violent explosion or detonation decomposes the acetylene into its elements carbon and hydrogen, and results in the deposition of a very finely divided form of carbon black, which also possesses a high obscuring power. In fact, experimental tests have proven that carbon black so produced is especially adapted for compounding with rubber to produce high quality products.

Although the carbon black produced from acetylene gas possesses all the desirable characteristics necessary for compounding with rubber, it is relatively expensive, and one of the principal objects of the present invention is to obtain a carbon black which is comparable in quality with that produced from acetylene and is materially lower in cost. In order to accomplish this, acetylene gas may be mixed with other cheaper hydrocarbons, which are not so explosive in character, but which may be decomposed by utilizing acetylene to promote detonation within and subsequent thermal decomposition of a large fraction of all the hydrocarbons present in the mixture.

The term carbon black is utilized to denote the carbon deposit resulting from the decomposition of acetylene and other hydrocarbons. This explanation of the term is offered since carbon black is generally understood among the trade to denote the product of the incomplete combustion of natural gas.

The single figure of the accompanying drawing, which is a transverse sectional view of a cylinder adapted for confining gases under pressure, is an example of a device that may be utilized in practicing my invention.

Hydrocarbons, such as natural gas and light oils, as from the distillate of coal or its components, benzene, toluene, xylene or the like, either pure or in admixture, or any sufficiently volatile petroleum hydrocarbons, such as petroleum ether, are capable of decomposition into their elements carbon and hydrogen at a somewhat elevated temperature. In order to secure the necessary temperature, the hydrocarbons may be mixed with a small amount of air, or oxygen, to burn a fraction of them to form the heat necessary to heat the rest. However, this alone will not produce satisfactory decomposition without an excessive loss by burning. In other words, it becomes necessary to burn the larger portion of the hydrocarbon in order to heat the remainder sufficiently to decompose. If an attempt is made to explode an air-hydrocarbon mixture, such a concentration of air must be utilized that practically all of the hydrocarbon goes to $CO$ and $CO_2$. This is demonstrated in automobile engines.

Acetylene is inherently unstable, and, especially under pressure, decomposes with extreme violence into its elements with the rapid evolution of large amounts of heat. Consequently, the rapid decomposition or detonation of acetylene is utilized to promote the decomposition of the mixture. The violence and rapidity with which it decomposes depends, however, upon its partial pressure and the total pressure, and if the acetylene be mixed with the other hydrocarbons and air, its detonating action is greatly decreased. This reduction in the detonating action of the acetylene, by its diffusion into the other gas, may be obviated by the manner of introducing the gases into an explosion chamber and the manner of ignition. For example, the air and other hydrocarbons may first be introduced into the explosion chamber, and the acetylene introduced into the chamber last, when a suitable pressure may be established. Immediately after the introduction of the acetylene into the explosion chamber, and before it has had time to diffuse into the rest of the gas, get diluted and have its detonating action decreased, an electric spark may be caused to ignite or detonate the almost pure acetylene remaining near the inlet opening of the chamber. Such a method effects a detonation of the almost pure acetylene gas whereby the entire gaseous content of the explosion chamber is exploded with extreme violence.

Obviously, the necessity of segregating the acetylene gas from the mixture of other hydrocarbons and air might be avoided by employing a higher pressure for the whole mixture. However, this is not so desirable because the pressure realized upon the explosion of such a mixture is proportional to the initial pressure. It is desirable, therefore, to maintain the initial pressure as low as possible to obtain the detonating result, since very high pressures introduce difficulties in the construction of an explosion chamber of sufficient strength.

In order to insure a clear and accurate understanding of my invention, reference may be had to the drawing in which is shown a cylinder 1 having a removable head 2. The cylinder has a double wall construction into which conduits 3 and 4 are connected to provide for circulating a cooling medium, such as water, around the cylinder walls. An inlet pipe 5 is fitted within a centrally located opening in the cylinder 1 to communicate with the interior thereof, and is provided with a suitable valve 6. A spark plug 7, of ordinary construction, is secured within the inlet pipe 5 adjacent to the cylinder to afford means for igniting or detonating the gas which is to be operated upon.

In practicing my invention, air or oxygen may be first admitted to the cylinder 1 through the inlet pipe 5, after which a hydrocarbon, such as petroleum ether, benzene, methane, or the like, is introduced into the chamber. Acetylene is then forced into the chamber and a suitable pressure is established. The pressure established in the explosion chamber may be varied to a great extent without sacrificing quality or percentage of yield of carbon black, but probably the lower limit of pressure should be substantially 15 pounds per square inch, and the upper limit is controlled by the strength of the explosion chamber that may be provided by known materials of construction. However, I have found that from 50 to 75 pounds per square inch produces very satisfactory results both in quality and quantity of production. The valve 6 in the inlet pipe is closed when a suitable pressure of the gas is established in the chamber. Immediately after the acetylene has been introduced into the chamber, a spark is caused to bridge the spark gap of the plug by any suitable means, not shown, whereupon the acetylene gas adjacent the inlet opening of the chamber is detonated.

The detonation of the acetylene effects a decomposition of the other hydrocarbon introduced into the chamber, and a carbon black of very high quality is deposited in the chamber. In order to maintain the quality of the carbon black thus produced, it should be removed from the explosion chamber at frequent periodic intervals. If desired, it may be removed after each explosion, or it may be removed after a number of explosions, it only being necessary to determine how long the carbon black deposit may be left in the chamber without deterioration. The cylinder is, of course, constantly cooled by a circulation of water through the conduits and around the cylinder jacket.

It has been determined that oxygen mixed with acetylene improves the carbon black resulting from its detonation, by giving the carbon black a very jet black luster, which is desirable when the product is utilized in the production of paints, varnishes, and the like. Consequently, the luster of the carbon black produced from mixtures of acetylene and other hydrocarbons may likewise be improved by utilizing oxygen rather than air in such mixtures.

If petroleum ether or other volatile petroleum hydrocarbons are utilized in admixture with acetylene, such hydrocarbons are introduced into the explosion chamber in the form of a vapor. It is desired, therefore, that the term gas, as employed in the claims, be interpreted to include the vapor form of light oils or volatile petroleum hydrocarbons.

The proportions that may be utilized in the admixture of gases in the explosion chamber may also be varied to a great extent, but I have found, for example, that five volumes of acetylene may be admixed with five volumes of methane, or any of the other hydrocarbons, under substantially 75 pounds per square inch pressure, with good results.

It should be noted that only a very small proportion of methane, for example, may be exploded in a mixture of acetylene gas and air at atmospheric pressure. The highest proportion of methane that may be utilized in a mixture of acetylene under atmospheric pressure is one-tenth volume of methane, four volumes of acetylene and one volume of air, but if the gases are put under a pressure of 75 pounds per square inch, seven-tenths volume of methane may be mixed with four volumes of acetylene and one volume of air to secure a high yield of carbon black. The proportion of methane may be further very greatly increased by utilizing the method of detonation above outlined, that is, by detonating the acetylene gas before it diffuses into the other confined gas. However, the present invention is mainly concerned with the admixing of cheaper hydrocarbons with acetylene and air, or oxygen, to produce a very high quality carbon black.

Although any of the various hydrocarbons mentioned are suitable for the production of carbon black when detonated with acetylene, nevertheless, some of them are especially suitable. For example, petroleum ether, compared with a volumetrically equal quantity, is productive of five or six times the carbon obtainable from methane, and since acetylene is so expensive, the increased carbon yield on acetylene more than pays the difference of the increased price of petroleum ether over methane. It will be seen, therefore, that the selection of the particular hydrocarbon utilized with acetylene will be influenced greatly by the relative quantity of production of carbon black from the hydrocarbons and their market price at any given time.

Although I have specifically described mixtures of gases that may be utilized in the production of carbon black in accordance with my invention, it is obvious that minor changes may be made in practicing the method and in the proportions of the gases in the mixtures utilized without departing from the spirit or scope of the invention, and I desire, therefore, that no limitations shall be imposed except those included in the appended claims.

What I claim is:

1. A method of producing carbon black that involves the continuous repetition of a cycle which comprises introducing a charge of acetylene, another hydrocarbon which is in a gaseous phase and air in a chamber under pressure, detonating such charge and cooling the walls of the explosion chamber.

2. A method of producing carbon black that involves the continuous repetition of a cycle which comprises introducing a charge of acetylene, another hydrocarbon which is in a gaseous phase and air in a chamber under pressure, detonating such charge, cooling the walls of the explosion chamber, and removing the resulting carbon deposits at frequent intervals.

3. A method of producing carbon black that involves the continuous repetition of a cycle which comprises introducing acetylene, methane and air in a chamber under pressure and detonating such charge.

4. A method of producing carbon black that involves the continuous repetition of a cycle which comprises introducing a charge of acetylene, methane and air in a chamber under pressure, detonating such charge and removing the resulting carbon deposits at frequent intervals.

5. A method of producing carbon black that involves the continuous repetition of a cycle which comprises introducing a charge of acetylene, methane and oxygen in a chamber under pressure, detonating such charge and removing the resulting carbon deposits at frequent intervals.

6. A method of producing carbon black that involves the continuous repetition of a cycle which comprises introducing a charge of acetylene, methane and air in a chamber under pressure, detonating such charge, cooling the walls of the chamber and periodically removing the carbon deposits resulting from the decomposition of the gases.

In witness whereof, I have hereunto signed my name.

CHARLES S. VENABLE.